US007436427B2

(12) United States Patent
Basmadjian et al.

(10) Patent No.: US 7,436,427 B2
(45) Date of Patent: Oct. 14, 2008

(54) INTEGRATED CAMERA STAND WITH WIRELESS AUDIO CONVERSION AND BATTERY CHARGING

(75) Inventors: George Basmadjian, Union City, CA (US); Ferry Gunawan, Fremont, CA (US); David S. O'Brien, Mountlake Terrace, WA (US); Bruce Friedricks, Larkspur, CA (US); Mansour Behrooz, Fremont, CA (US)

(73) Assignee: Logitech Europe S.A., Romanel-sur-Morges (CH)

( * ) Notice: Subject to any disclaimer, the term of this patent is extended or adjusted under 35 U.S.C. 154(b) by 598 days.

(21) Appl. No.: 11/011,486

(22) Filed: Dec. 13, 2004

(65) Prior Publication Data

US 2005/0162508 A1 Jul. 28, 2005

Related U.S. Application Data

(60) Provisional application No. 60/529,149, filed on Dec. 11, 2003, provisional application No. 60/529,148, filed on Dec. 11, 2003.

(51) Int. Cl.
*H04N 7/14* (2006.01)
*H04N 5/225* (2006.01)

(52) U.S. Cl. .............. 348/14.01; 348/14.02; 348/14.08; 348/836

(58) Field of Classification Search ... 348/14.01–14.09, 348/14.1, 14.11–14.16, 375, 373, 150, 584, 348/836
See application file for complete search history.

(56) References Cited

U.S. PATENT DOCUMENTS

| 5,873,045 | A | * | 2/1999 | Lee et al. ................. 455/556.2 |
| 6,230,029 | B1 | * | 5/2001 | Hahn et al. ............... 455/575.2 |
| 6,912,564 | B1 | * | 6/2005 | Appelman et al. ........... 709/204 |
| 6,923,688 | B1 | * | 8/2005 | Burson et al. ............... 439/675 |
| 2002/0109770 | A1 | * | 8/2002 | Terada ..................... 348/14.08 |
| 2004/0257431 | A1 | * | 12/2004 | Girish et al. ............. 348/14.01 |
| 2005/0073574 | A1 | * | 4/2005 | Krisbergh et al. ........ 348/14.01 |

FOREIGN PATENT DOCUMENTS

| JP | 06-046413 | * | 2/1994 |
| JP | 09-116961 | * | 5/1997 |
| JP | 2001-102950 | * | 4/2001 |

* cited by examiner

*Primary Examiner*—Melur Ramakrishnaiah
(74) *Attorney, Agent, or Firm*—Townsend and Townsend and Crew, LLP

(57) ABSTRACT

The present invention provides a combined camera, camera stand, audio hub, and audio headset charger. The audio headset is wireless, with a wireless connection to the stand/hub. The stand/hub then connects over a bus to a personal computer. The camera can be both tilted and adjusted in height on the stand. Seamless switching from one audio path (e.g., external speakers and microphone in webcam) to another (e.g., wireless headset) occurs, providing the user with a regular telephone like experience. In addition, it is easily possible to mute audio as well as video for the entire system.

9 Claims, 13 Drawing Sheets

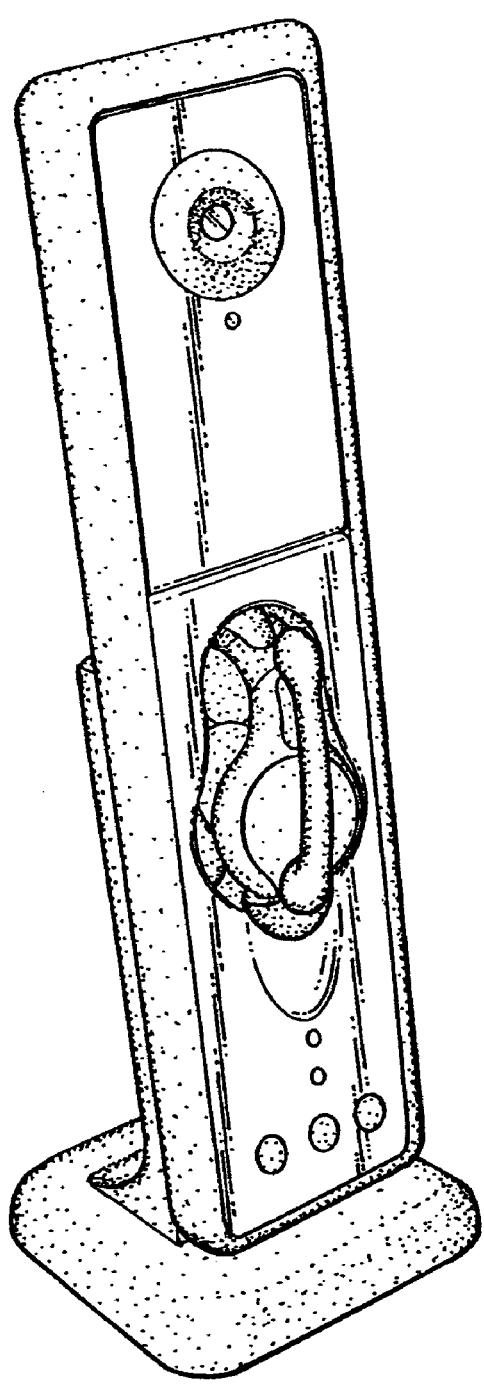 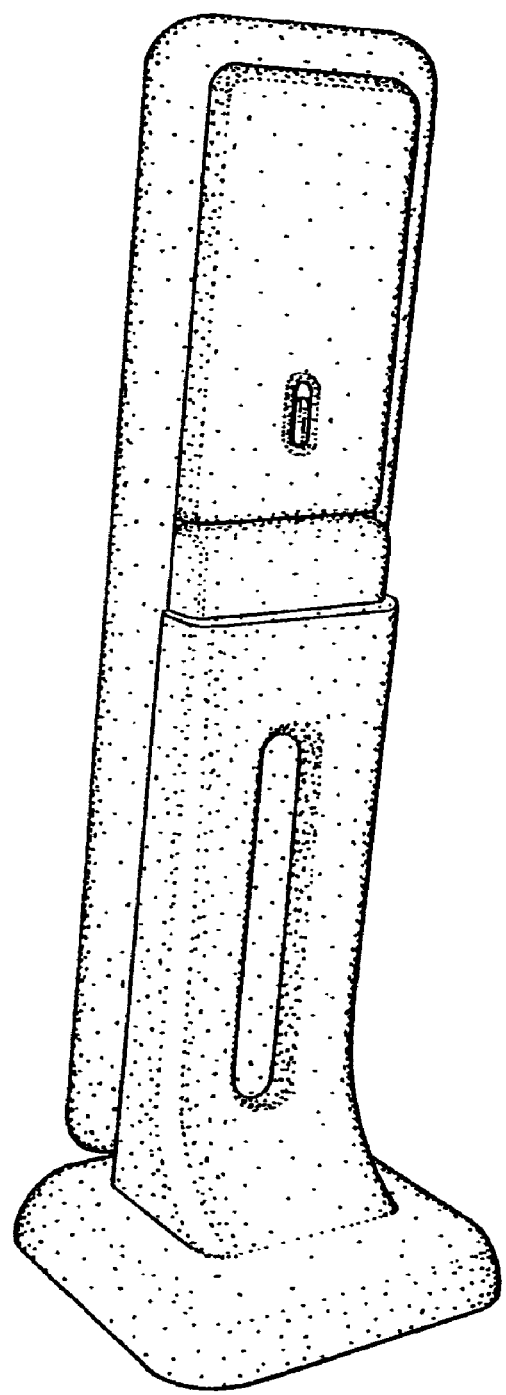
*FIG. 7*     *FIG. 8*

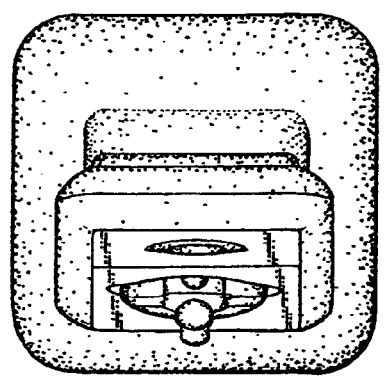
FIG. 9
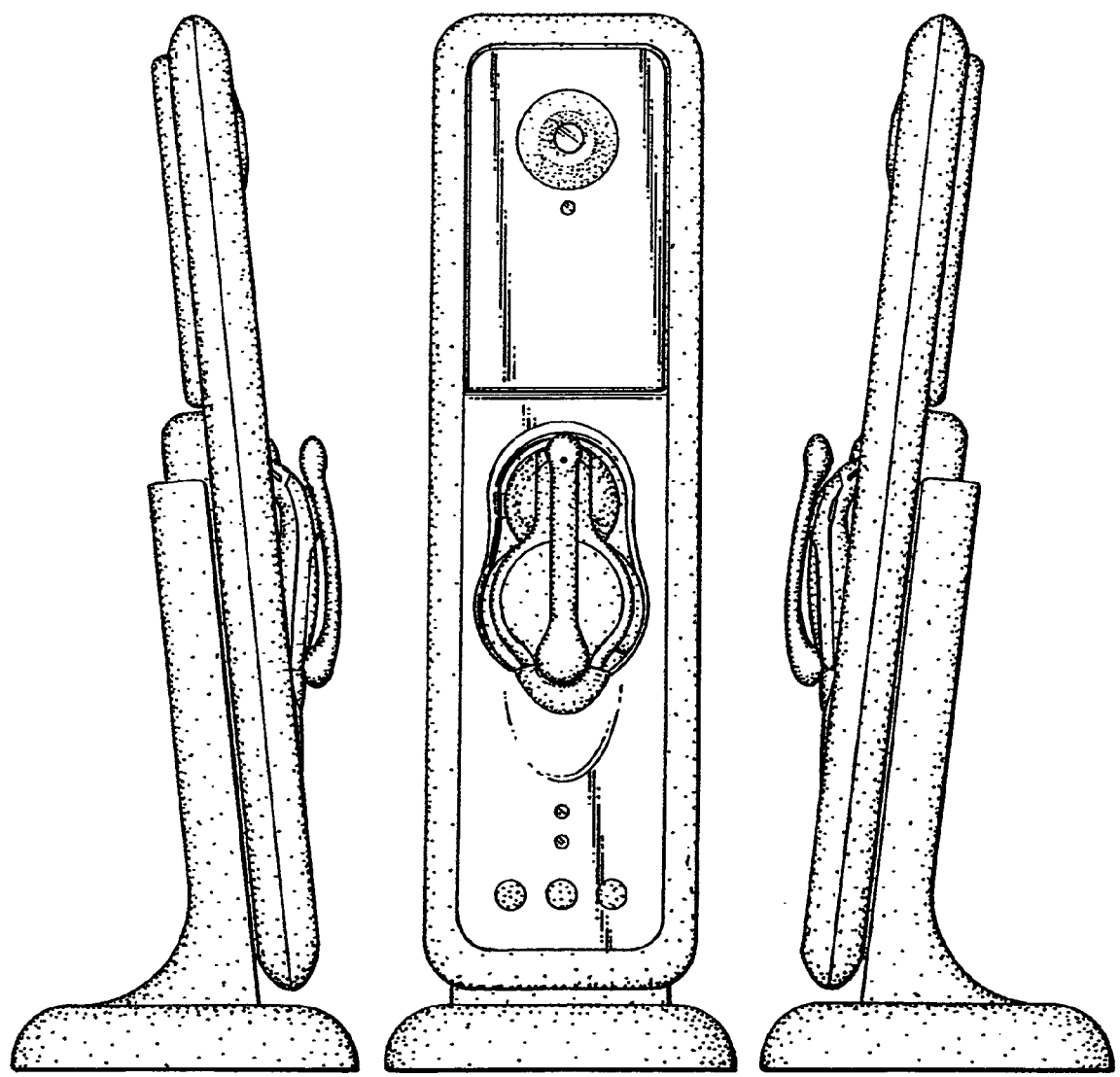
FIG. 12     FIG. 10     FIG. 11

INTEGRATED CAMERA STAND WITH WIRELESS AUDIO CONVERSION AND BATTERY CHARGING

CROSS-REFERENCES TO RELATED APPLICATIONS

This application claims priority from provisional application No. 60/529,148, entitled "Camera Stand with Wireless Headset Battery Charger", filed on Dec. 11, 2003, and from provisional application No. 60/529,149, entitled "Camera Stand with Wireless Audio Conversion", also filed on Dec. 11, 2003, both of which are incorporated herein in their entirety.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

1. Field of the Invention

The present invention relates to cameras mounted on a stand, and also to headsets and battery chargers.

2. Description of the Related Art

Over the past few years, electronic contact between people has increased tremendously. Various modes of communication are used to electronically communicate with each other, such as emails, text messaging, etc. In particular, video conferencing and Video Instant Messaging (IM) (which permits people to communicate with each other over the Internet in real time ("IM chats")), have become increasingly popular. Several other applications may exist, where still image, video and/or audio data is transmitted, such as live video streaming, video capture for purposes of creating movies, video surveillance, internet surveillance, internet webcams, etc.

Several cameras exist which can be used for such electronic video and audio communication. Some such cameras have the ability to capture still image data as well. For purposes of video real time chats, these cameras are often connected to a user's computer, and the data captured by the camera is transmitted to the computer.

Typically such a communication involves a webcam mounted on the computer, with the user speaking into a microphone that plugs into the computer. The user needs to obtain and set up not only the camera, but often also a separate microphone (in cases where the camera does not have an embedded microphone) and separate speakers, or a separate headset. If the user uses a corded headset, this significantly limits the user's freedom to move around. If the user uses a cordless headset, the user either has to continually replace its batteries, or, if the batteries are rechargeable has to have a separate charger for the headset. Obtaining and setting up these numerous devices clutters the user's desk, is expensive, complicated, and generally takes away from the user's experience.

Further, users are generally accustomed to conducting phone calls on regular phones. Setting up and using the various different devices mentioned above leads to an experience which is very different from the experience of a regular phone call.

Intel U.S. Pat. No. 6,572,282 shows a camera stand that allows the camera to be tilted at different angles. In particular, the camera can be clicked into multiple indexed positions. Kodak U.S. Pat. No. 5,131,351 shows a charging stand for a camera, to recharge a camera. However, none of these provides a single device which includes a video camera, a cordless headset, and a battery charger for the cordless headset. Also, none of these provide a familiar, regular phone call type experience for the user.

Thus there is a need for a tightly integrated device that provides a user with a cohesive video and audio communication experience with reduced desktop clutter. Further, there is need for a device which provides the ease of use and experience associated with a regular phone call.

BRIEF SUMMARY OF THE INVENTION

The present invention provides a combined camera, camera stand, audio conversion circuit, and audio headset charger. A device in accordance with an embodiment of the present invention provides the user with ease of use, and an experience associated with a regular phone call.

The audio headset is wireless, with a wireless connection to the stand/hub. The stand/hub then connects over a bus to a personal computer, with the same cable being used for both relaying the information from the audio headset, and the video from the camera. In addition, the cable can also be used for powering the device. The camera can be both tilted and adjusted in height on the stand.

In one embodiment, the device includes some buttons. In one embodiment, a launch button and a pause button are included. The launch button can have numerous functions, including launching a related software application, answering an incoming call over the speakerphone, and so on. In one embodiment, the pause button interrupts both the video and audio transmission. The audio transmission is silenced electronically, and the video transmission is interrupted by covering the lens of the video module with a mechanical shutter.

In one embodiment, seamless switching from one audio path (e.g., external speakers and microphone in webcam) to another (e.g., wireless headset) occurs, providing the user with a regular telephone like experience. Such switching of audio paths is dependent on the states of various components of the system (e.g., whether the headset is docked or undocked), and the user's actions.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

FIG. 7 is a front perspective view of a device in accordance with an embodiment of the present invention.

FIG. 8 is a rear perspective view thereof.

FIG. 9 is a top plan view thereof.

FIG. 10 is a front elevational view thereof.

FIG. 11 is a left side elevational view thereof.

FIG. 12 is a right side elevational view thereof.

DETAILED DESCRIPTION OF THE INVENTION

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein.

Figure 1:
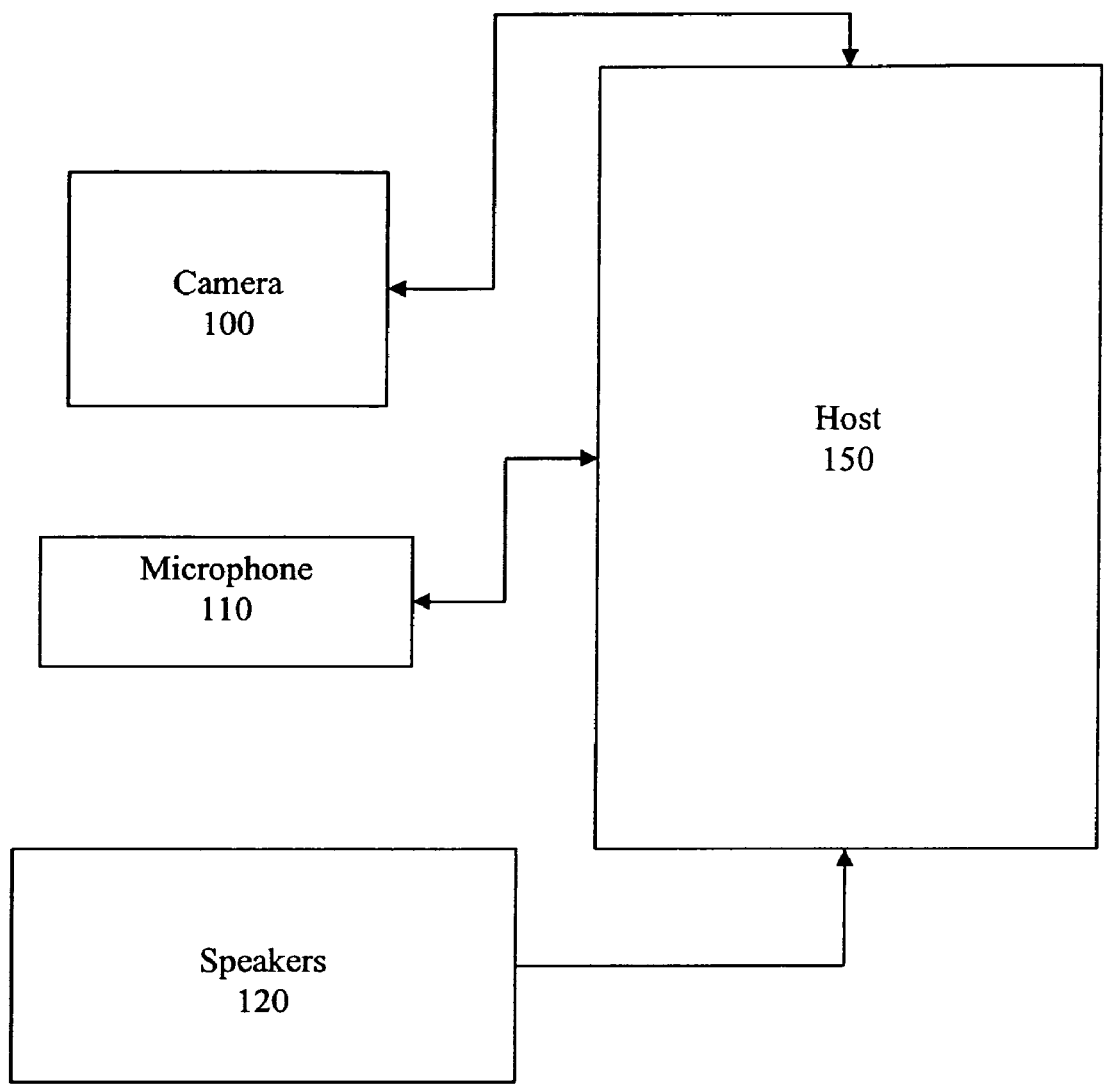
FIG. 1 is a block diagram of a conventional system used for video communication using a computer.

FIG. 1 is a block diagram of a conventional system used for video communication via a host. The conventional system comprises a camera 100, a microphone 110 and speakers 120, all connected to a host 150.

Camera 100 can be any camera connectable to host 100. For instance, camera 100 can be a webcam. In one embodiment, camera 100 is a QuickCam® camera from Logitech, Inc. (Fremont, Calif.). It is to be noted that while, in the below discussion, reference is made to webcams, the present invention can also be applicable to any types of cameras connectable to a host 100.

The microphone 10 can be any microphone connectable to the host 100. In one embodiment, the microphone 10 is an independent device. Such microphones can be, for example, any microphones designed for use with personal computers, such as Logitech® Desktop Microphone or Logitech® USB Desktop Microphone from Logitech, Inc. (Fremont, Calif.). In another embodiment, the microphone 110 may be embedded in the camera 100.

The speakers 120 can be any speakers connectable to the host 100. For example, such speakers can be Logitech® X-230, Logitech® Z-3, from Logitech, Inc. (Fremont, Calif.).

The host 150 could be any host which is able to communicate with the camera 100, and/or with another host through a network. The network can be a Wide Area Network (WAN) or a Local Area Network (LAN), or any other network. A WAN may include the Internet, the Internet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or Windows NT from Microsoft Corporation (Redmond, Wash.). The network 120 may also include commercially available subscription-based services such as, for example, AOL from America Online, Inc. (Dulles, Va.) or MSN from Microsoft Corporation (Redmond, Wash.).

Thus the host 150 could be a personal computer (desktop or laptop), a handheld computer or organizer (such as a Personal Digital Assistant (PDA)), a cellular phone, an embedded automotive solution capable of interfacing with webcam and/or network, and so on. In one embodiment, the host is part of conventional computer systems, that may include a storage device, a network services connection, and conventional input/output devices such as, a display, a mouse, a printer, and/or a keyboard, that may couple to a computer system. The host 100 also includes a conventional operating system (such as MS Windows, Mac OSX operating system, etc.), input/output device, and network services software. In addition, in one embodiment, the host 100 includes video conferencing software such as Polycom PVX and ViaVideo from Polycom (Pleasanton, Calif.), and ViGO™ from VCON (Israel). In one embodiment, the host 100 includes IM software, such as ICQ from ICQ, Inc., America OnLine Instant Messenger (AIM) from America Online, Inc. (Dulles, Va.), MSN® Messenger from Microsoft Corporation (Redmond, Wash.), and Yahoo!® Instant Messenger from Yahoo! Inc. (Sunnyvale, Calif.).

Figure 2:
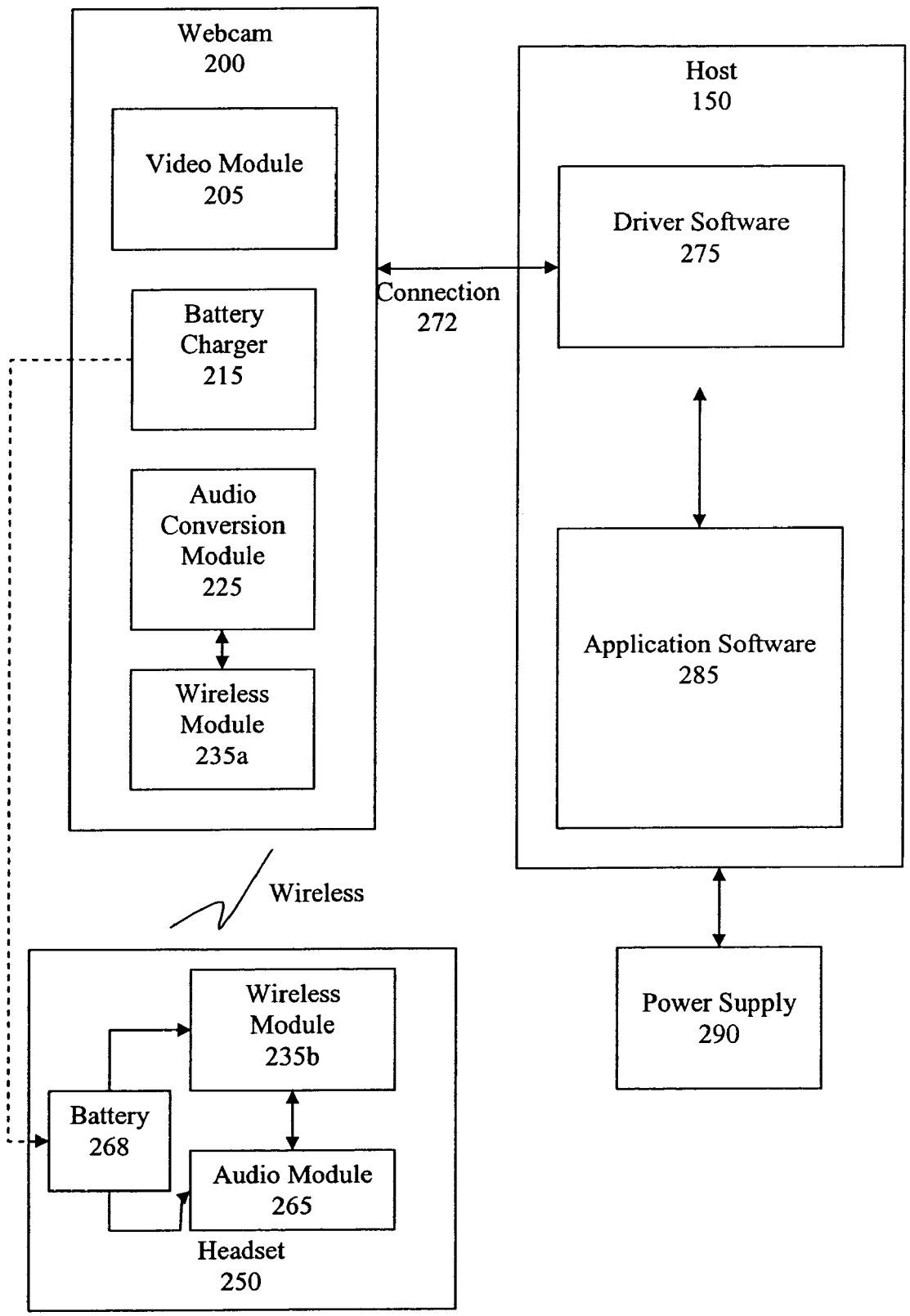
FIG. 2 is a block diagram of a system in accordance with an embodiment of the present invention.

FIG. 2 is a block diagram of a system in accordance with an embodiment of the present invention. FIG. 2 depicts a webcam 200, a cordless headset 250, a host 150, and a power supply 290.

The webcam 200 comprises a video module 205, a battery charger 215, an audio-conversion module 225 and a wireless module 235a. The video module 205 comprises the lens, sensor, and firmware that allows video processing and compression. In one embodiment, the battery charger 215 is connected to the power supply 290 via the host 270. In one embodiment, the battery charger 215 is connected to the power supply 290 directly.

In one embodiment, the wireless module 235 comprises a transceiver which can both transmit and receive wireless signals. In one embodiment, the wireless module 235a is a transmitter. In another embodiment the wireless module 235a is a receiver. The wireless module 235 can use any wireless protocol, such as RF, Bluetooth, etc. Further, the carrier can be on the order of 27 MHz, 233 MHz, 433 MHz (e.g., 433.92 MHz) or 900 MHz (e.g., 916.5 MHz) or 2.4 GHz, although any suitable frequency will be acceptable.

The audio-conversion module 225 converts audio signals received by the wireless module 235a from the wireless module 235b in the cordless headset 250, into signals appropriate for the connection 272 to the host 150. For instance, if the connection 272 is a USB connection, the received audio signals are converted into signals appropriate for USB. In the opposite direction, audio signals provided from the person on the other side of the video communication arrive over via the host 150, the audio conversion module 225, where they are converted into signals appropriate for wireless transmission and provided to wireless module 235a for transmission back to the wireless module 235b in the cordless headset 250.

The cordless headset 250 includes an audio module 255, a wireless module 235b, and a battery 268. (It is to be noted that the terms cordless and wireless are used interchangeably.) The audio module 255 includes circuitry for audio processing, compression etc. The wireless module 235b is similar to the wireless module 235a discussed above. The battery 268 can be any rechargeable battery such as a Lithium Ion battery, a Nickel-Metal-Hydride battery, etc. In one embodiment, when the cordless headset 250 is docked into the webcam 200, the battery charger 215 charges the battery 268 in the cordless headset 250.

Host 150 includes driver software 275 and application software 285. The driver software 275 serves as an interface to pass parameters from the webcam 200 to the application software 285. Such parameters can include information relating to human interfaces to determine user's desired action (making a call, hanging up a call, etc.). For example, the driver software 275 may provide the application software 285 information about whether or not the headset 250 is docked into the device, or is being currently used by the user, etc.

The application software 285 can be any third party software, such as video-conferencing software such as Polycom PVX from Polycom (Pleasanton, Calif.). In one embodiment, the application software 285 can be IM software, such as ICQ from ICQ, Inc., America OnLine Instant Messenger (AIM) from America Online, Inc. (Dulles, Va.), MSN® Messenger from Microsoft Corporation (Redmond, Wash.), and Yahoo!® Instant Messenger from Yahoo! Inc. (Sunnyvale, Calif.). In one embodiment, the application software 285 can be any video calling application such as Logitech VideoCall from Logitech, Inc. (Fremont, Calif.), Sightspeed 3.0 from Sightspeed (Berkely, Calif.), on premise or hosted video enabled web conferencing such as WebEx from WebEx Communications, Inc. (San Jose, Calif.), Viditel from Santa Cruz Networks, Inc. (Santa Cruz, Calif.), Click to Meet™ from First Virtual Communication (Redwood City, Calif.), or even a non-video application with audio only such as Skype from Skype (Luxembourg) or the audio call feature of MSN® from Microsoft Corporation (Redmond, Wash.), or any other IP based audio chat and calling application.

In one embodiment, the connection 272 between the webcam 200 and the host 150 can be a physical connection, e.g., a Universal Serial Bus connection (e.g., USB 1.1, USB 2.0, etc.), a FireWire connection, a serial bus connection, and so on. In other embodiments, the connection 272 between the webcam 200 and the host 150 can be wireless, e.g., an IR connection, an RF connection (27 MHz, 2.4 GHz, etc.), a Bluetooth connection, and so on. It is to be noted that the connection between the webcam 200 and the host 150 is not limited to any specific type. In one embodiment, the single connection 272 between the webcam 200 to the host 150 suffices to transfer video data from the webcam 200, and the audio data from/to the cordless headset 250, and the power for the various components (including the battery charger 215).

Figure 3:
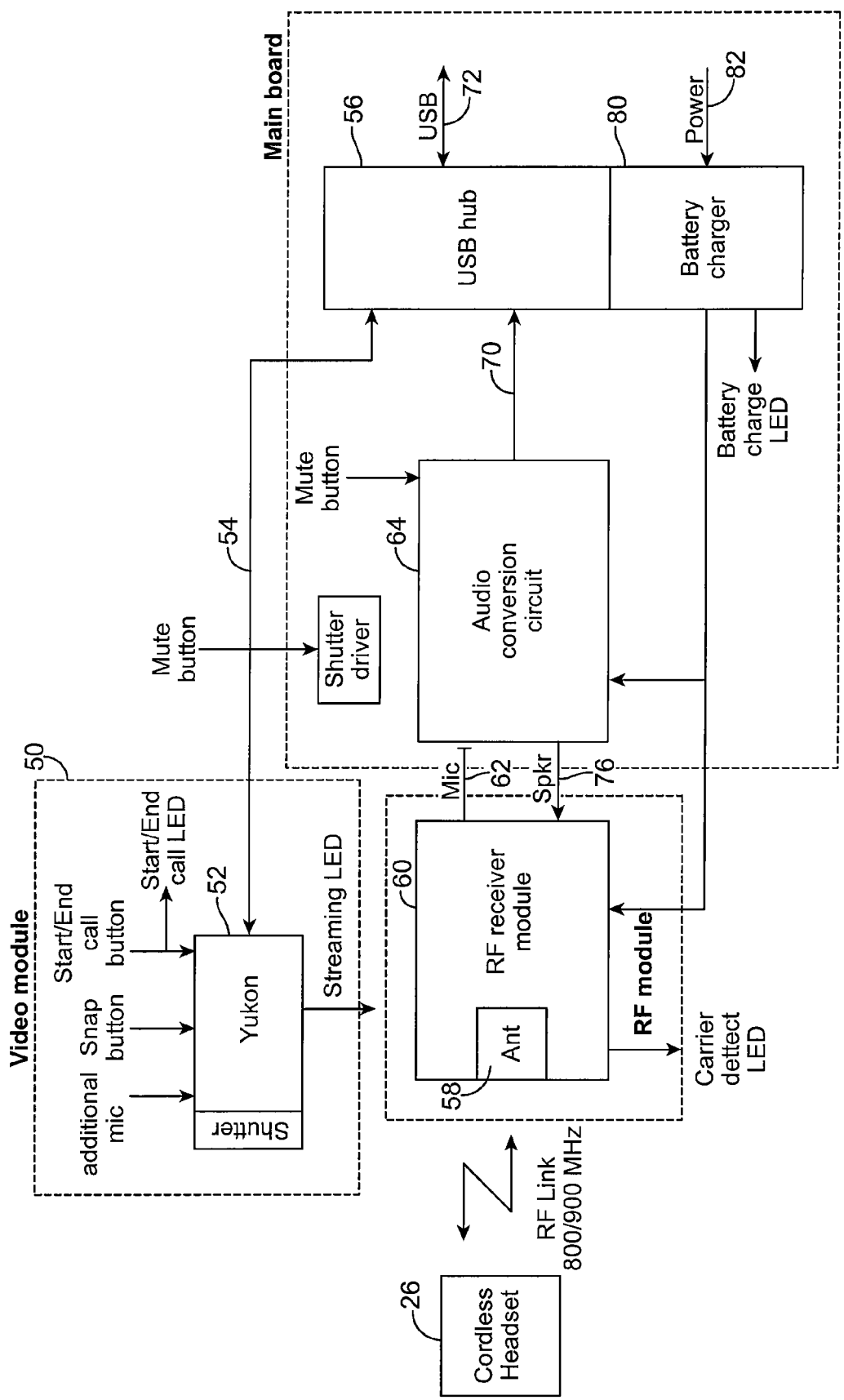
FIG. 3 is another block diagram of the electronics of a system in accordance with the present invention.

FIG. 3 is another block diagram of the electronics of a system in accordance with an embodiment of the present invention. As discussed above, the video module 205 includes camera electronics 352 for processing the signal received by a CMOS, CCD or other sensor. The signals of the sensor are processed and then provided over a bus 354 to a USB hub 356. Camera electronics 352 provide connections, as can be seen, for the microphone, a Snap button 440, the Start button 436 and various LEDs. These buttons and LEDs are discussed below with reference to FIG. 4. These are all routed through the electronics that also handle the camera video image.

Separately, the cordless headset 250 provides, in one embodiment, a wireless signal to an antenna 358 in a wireless module 235a. The received audio signal is provided to an audio conversion circuit 225 that converts the signals into signals appropriate for, in one embodiment, a USB bus 272. In the opposite direction, audio signals provided from the person on the other side of the video conference arrive over a USB bus 272 from the internet and computer, through USB hub 356, line 370, audio conversion circuit 225 and another speaker output 376 where they are provided to antenna 358 for transmission back to cordless headset 250.

A separate battery charger 215 receives a power signal on a line 382 and provides power to the audio conversion circuit 225 and the wireless module 235a, as well as other electronics. The cordless headset will connect directly into the battery charger unit 215 and its receptacle when charging.

In one embodiment, the connection between the headset 250 and the wireless module 235a is in Bluetooth protocol. Bluetooth signals are then converted into USB signals for transmission over a USB bus. In an alternate embodiment, the headset 250 can be configured to be capable of communicating directly with the host 270 that is equipped with a Bluetooth receiver. Thus, a consumer has the option of using the Bluetooth receiver in the camera mount or going directly to the host 270 for hosts that are so equipped. In one embodiment, two different headsets would be sold depending upon the use desired by the consumer.

The present invention solves a dilemma facing consumers in the past who have purchased cameras without microphones, which require the user to connect speakers and a microphone to their PC in addition to the camera in order to communicate using video conferencing or video calling software. The present invention integrates the microphone and headset functionality in a single device that connects to a PC via a single USB connection. The setup of such a system is more straightforward and simple than previous solutions.

Preferably, the headset used in the present invention is a Logitech cordless headset currently sold for use with mobile telephones. It avoids the typical computer headset over-the-head or behind-the-neck arrangement, neither of which presents a professional image while on camera.

Figure 4:
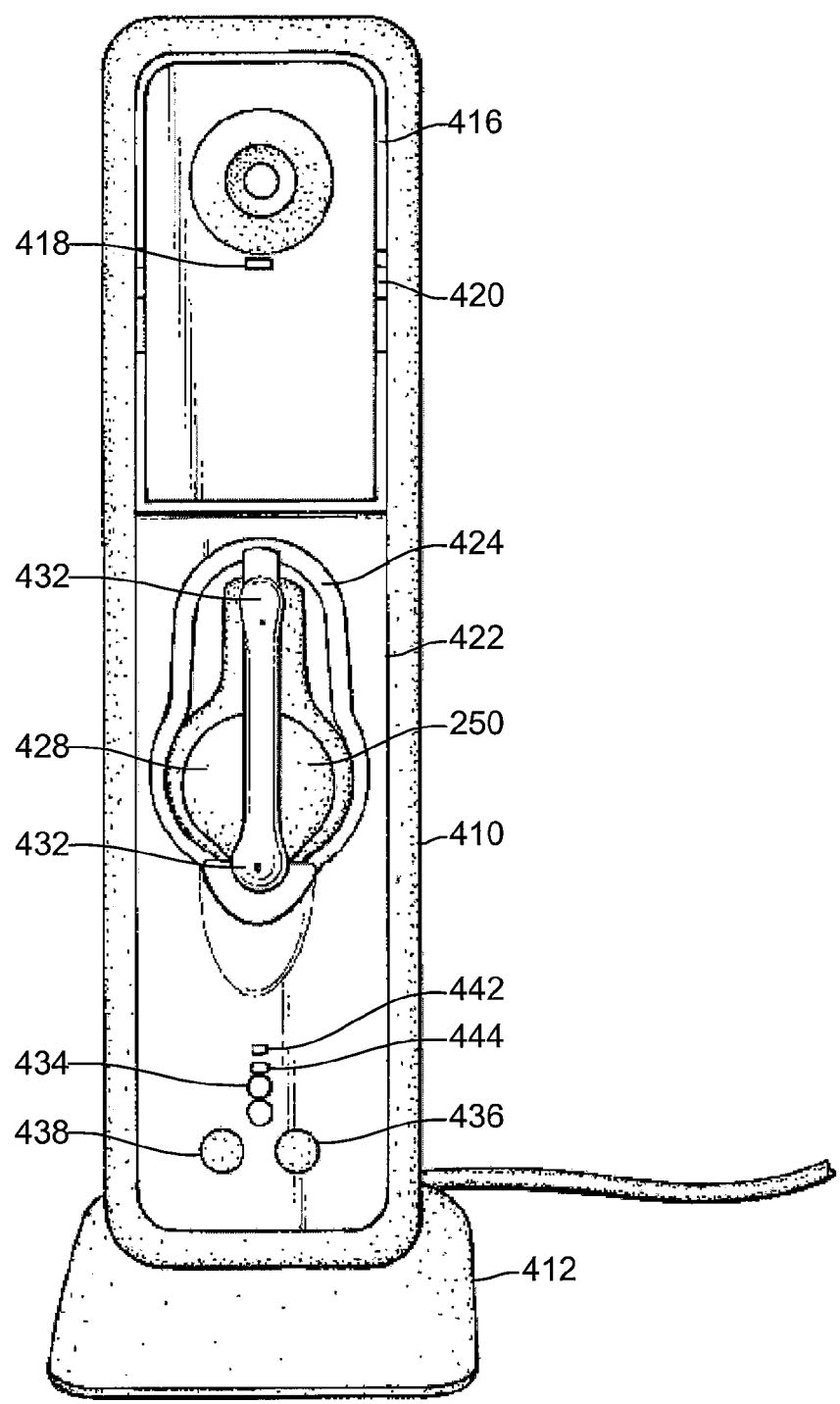
FIG. 4 is a front perspective view of a camera stand with wireless headset in accordance with an embodiment of the present invention.

FIG. 4 shows a device in accordance with an embodiment of the present invention. A support 410 is mounted on a camera stand 412 via the notches described below, not visible in this view. A video module is mounted in a top module 416 that also provides a video streaming LED 418. Module 416 rotates on an axle 420, on a pivot through which the wired connection to the video module passes into camera support 410.

The lower portion includes a module 422 with a receptacle 424 for storing an audio headset 250. The audio headset is shown folded, with a speaker portion 428 for going over a user's ear, and a microphone portion 434 that folds out from a pivot axis 432. Receptacle 424 includes contacts for making contact with the audio headset 250 to provide a battery charging function. Thus, the receptacle not only provides a place for storing the audio headset, it provides a place for charging it as well.

The bottom module shows an additional microphone 434 that provides a speaker phone capability. In one embodiment, the user can either use the microphone 434 on the device along with separate speakers to engage in a call, or he/she can use the cordless headset 250 to receive and transmit audio. In one embodiment a user can use a separate external microphone along with separate speakers to engage in a call. In one embodiment, both speaker(s) and a microphone are added to the camera mount, allowing it to be a video speakerphone without use of the headset. In another alternate embodiment, a corded headset is used. This eliminates the need for the wireless receiver and transmitter, enabling a lower cost solution, while still combining the audio from the headset and the video in a single device.

In one embodiment, a device in accordance with an embodiment of the present invention provides three mechanisms for interacting with the device to control call behavior: 1. Headset cradle dock; 2. Headset connection button; and 3. Base buttons. All of these controls taken together allow for tightly integrated call control functionality, similar to a cordless telephone with speakerphone base station.

The device has multiple buttons on the base unit and a switch mechanism in the Bluetooth cradle. In one embodiment, the buttons on the base unit include a Launch button 436, and a Pause button 438. This simple two-button configuration provides a very easy to use device for the consumer. In another embodiment, a Snap button may also be included, which is used for taking a still picture snapshot.

The Pause Button 438, when pressed, will interrupt both the audio and video received by the host 150. In one embodiment, the device may stop capturing audio and/or video data. In another embodiment, the device may stop transmitting audio and/or video data to the host 150. In one embodiment, audio is electronically silenced while the video is hidden via a mechanical shutter, providing the user privacy. Such one-touch functionality for interrupting both the audio (muting) and the video provides the user with ease of use.

In one embodiment, the Launch button 436 has several functions, which include:
Launching an Application (if the application is closed)
Restoring an Application (if the application window has been hidden)
Answering a Call (when ringing)
Disconnecting a Call (when in a call)
Transferring a Call to speakerphone Below the buttons is a carrier detect LED 442 and a charger LED 444. The charger LED 444 indicates that the headset 250 has been placed properly in receptacle 424 so that contact has been and it is in fact charging. The carrier detect LED 442 indicates that a carrier signal from the headset has been detected during operation.

Figure 5:
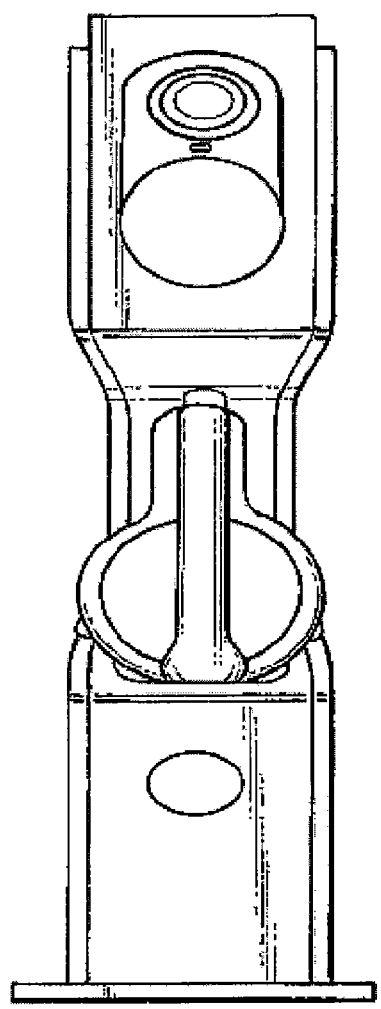
FIG. 5 is another view of one embodiment of the camera stand and audio headset charger with a wide angle lens and zoom and a speaker phone built into the camera stand.

FIG. 5 shows another embodiment with a different shape to the support structure and using a wide-angle lens for the camera. In one embodiment, the camera has optical zooming abilities. In another embodiment, the camera has digital zooming abilities. In yet another embodiment, the camera has both optical and digital zooming abilities.

The embodiment of FIGS. 4 and 5 thus provide a single integrated unit that minimizes the number of wires a consumer has to deal with. As discussed above, a single cable connecting to the device of FIG. 4 will carry audio signals from the wireless headset and video signals from the video camera. In one embodiment, signals for powering the device and powering the battery charger for the audio headset are also included in the same cable. In one embodiment, the power is provided to the device through this cable via the host 150. In one embodiment, this single cable is then split into two cables at the far end for connecting to power and to a USB or other bus port in the host 150. In yet another device, the power supply is connected to the device via a separate cable. The routing of the wiring to the pivot of the axle for the power module provides a clean design that eliminates extra cables connecting to the camera that may inhibit its functionality of tilting forward and back.

Figure 6A:
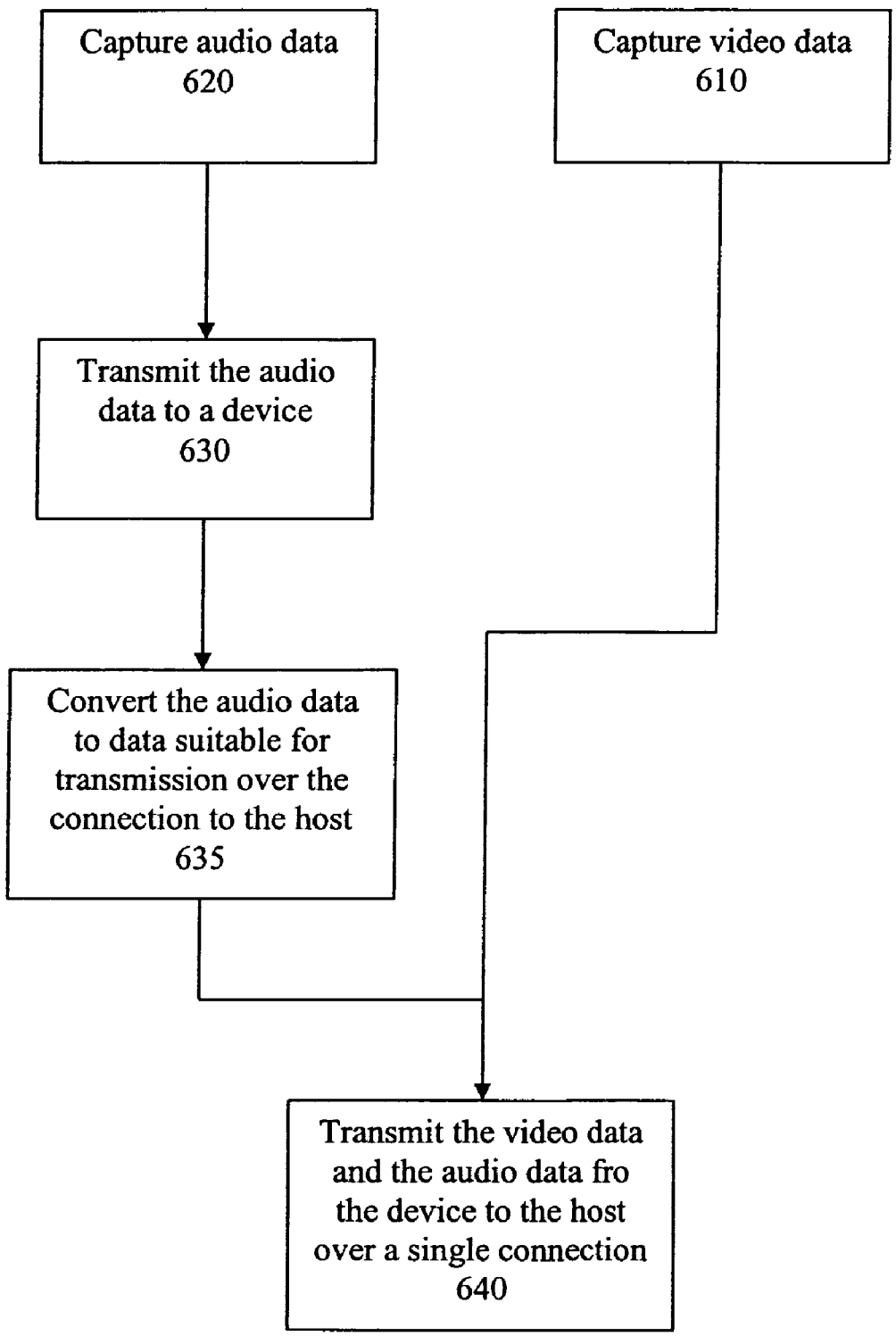
FIG. 6A is a flowchart of a method illustrating capture and transmission of video and audio data in one embodiment of the present invention.

FIG. 6A is a flowchart of a method illustrating capture and transmission of video and audio data in one embodiment of the present invention. The video data is captured (step 610) by the video module 205. The audio data (e.g., the user's voice) is captured (step 620) by the audio module 245. The audio data is then transmitted (step 630) to the device. In one embodiment, this is a wireless transmission by the wireless module 235b to the wireless module 235a. The audio conversion module 225 converts (step 635) the audio data into data suitable for transmission over the connection 272. The video data and the converted audio data are then transmitted (step 640) to the host 150 over a single connection 272.

Figure 6B:
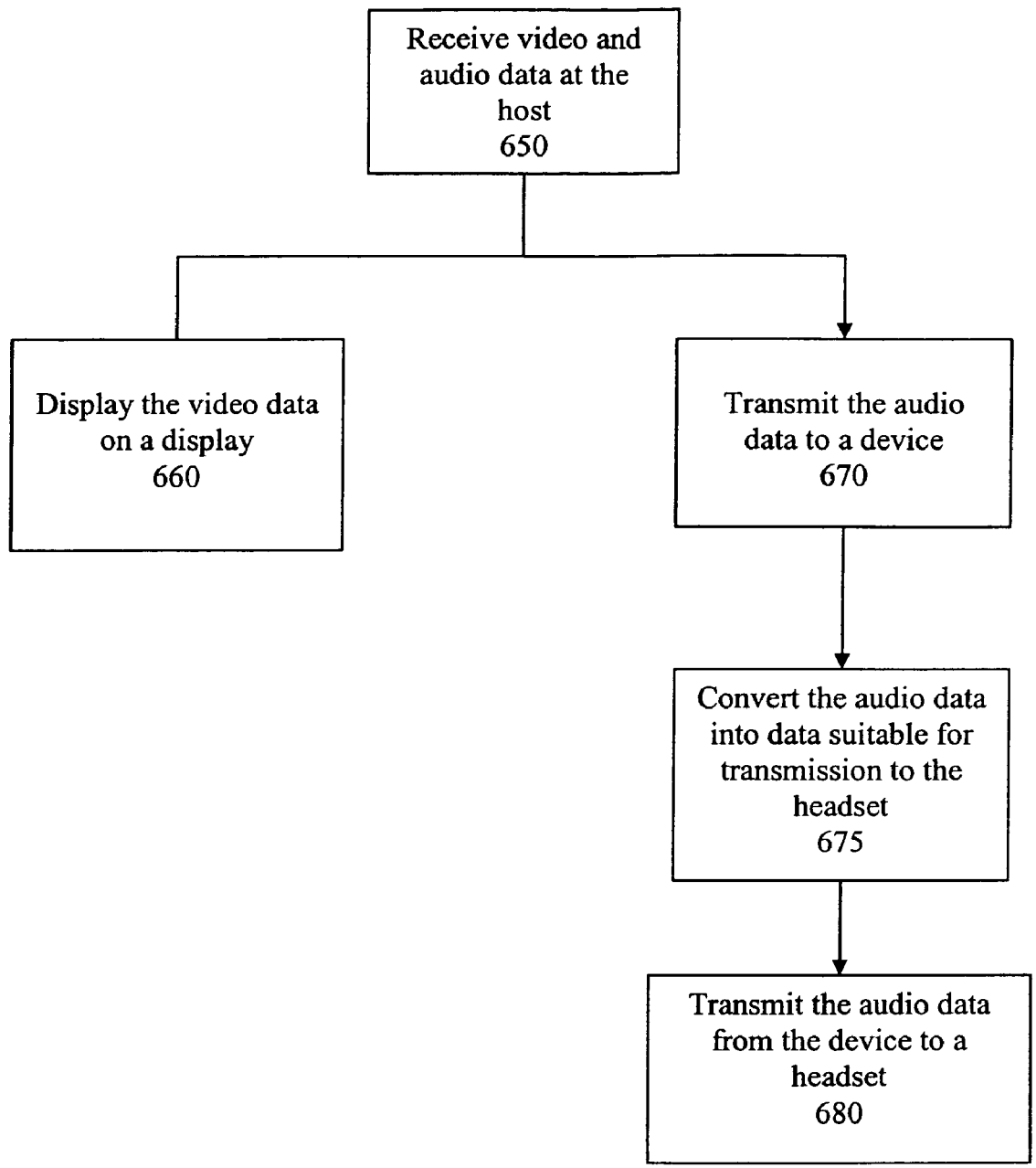
FIG. 6B is a flowchart of a method illustrating providing a user with received video and audio data in one embodiment of the present invention.
Figure 13:
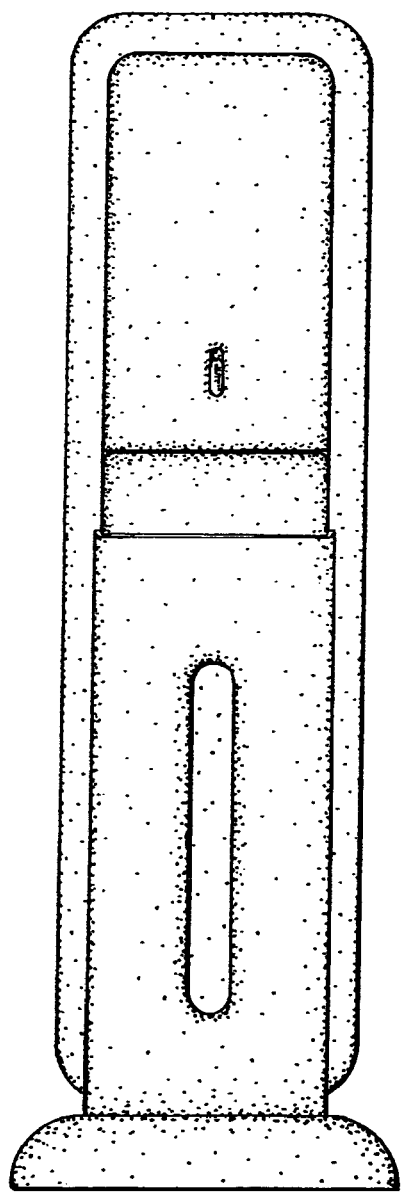
FIG. 13 is a rear elevational view thereof.
Figure 14:
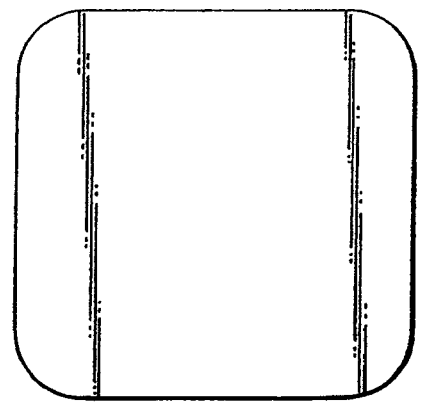
FIG. 14 is a bottom plan view thereof.
Figure 15:
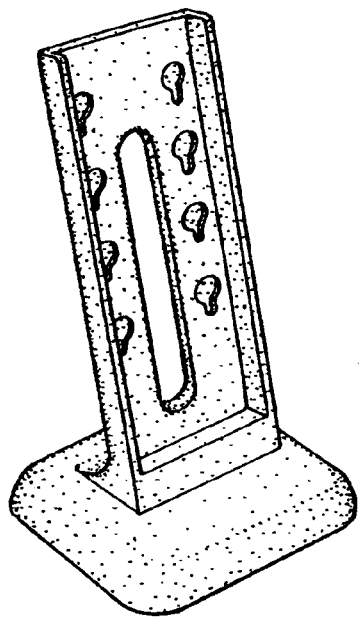
FIG. 15 is a perspective view of the camera stand base alone.
Figure 16:
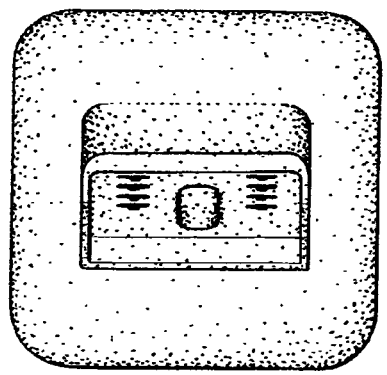
FIG. 16 is a top plan view thereof.
Figure 19:
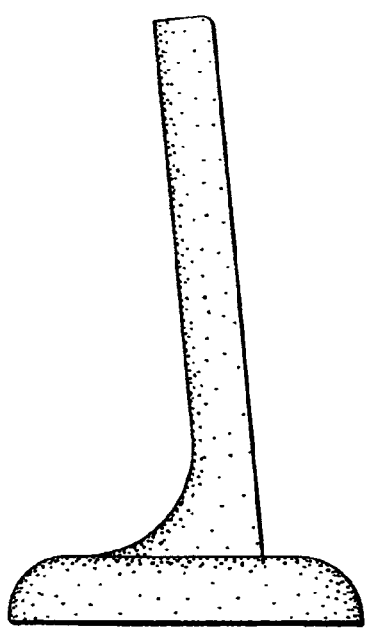
FIG. 19 is a right side elevational view thereof.
Figure 17:
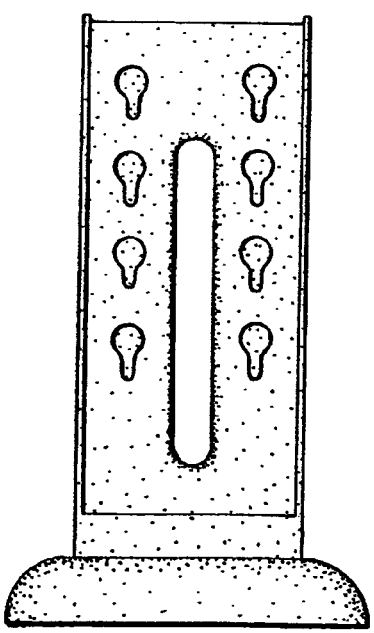
FIG. 17 is a front elevational view thereof.
Figure 18:
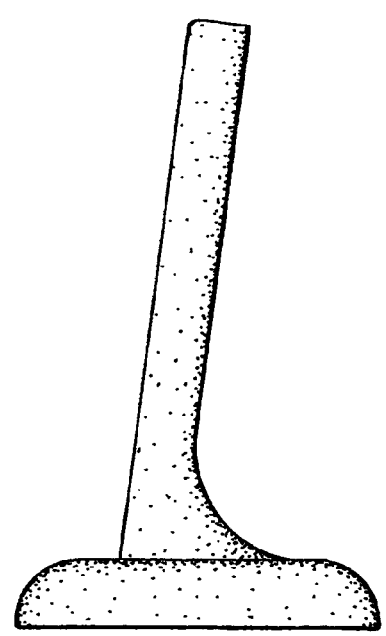
FIG. 18 is a left side elevational view thereof.
Figure 20:
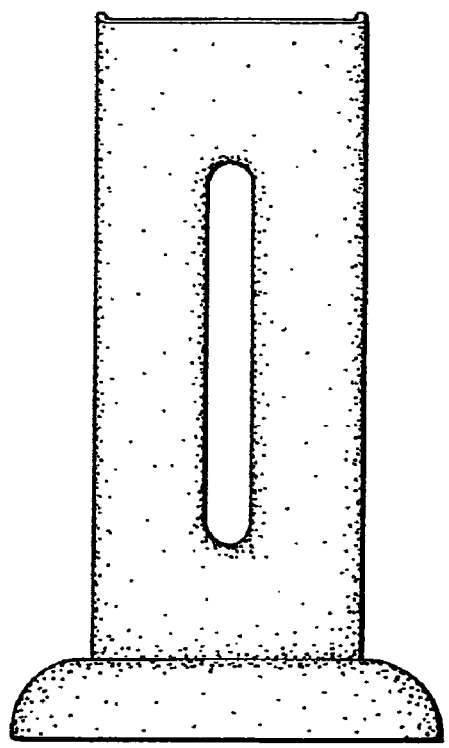
FIG. 20 is a rear elevational view thereof.
Figure 21:
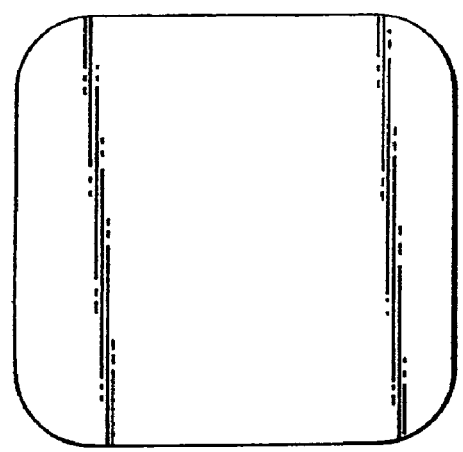
FIG. 21 is a bottom plan view thereof.

FIG. 6B is a flowchart of a method illustrating providing a user with received video and audio data in one embodiment of the present invention. Video and audio data is received (step 650) by the host 150. In one embodiment, such data is received by the host 150 over a network. The received video data is displayed (step 660) on a display connected to the host 150. The audio data is transmitted (step 670) to a device over a connection 272. The audio data is converted (step 675) into data suitable for transmission to the headset 250. The data is then transmitted (step 680) to the headset. In one embodiment, this transmission (step 680) occurs wirelessly.

FIGS. 7-14 illustrate various angles of a device in accordance with an embodiment of the present invention.

FIGS. 15-21 illustrate the camera stand base alone, showing multiple slots for a pair of studs or screws to allow adjustment of the height of the camera support above the camera stand base. As can be seen, four different notched positions are provided for adjusting the height.

It should be noted that a system in accordance with the present invention is aware of various states of the different components of the system, and intelligently takes different actions based on these states. For example, as can be seen from FIG. 4, a device in accordance with an embodiment of the present invention provides a docking station for the headset 250. A system in accordance with an embodiment of the present invention is aware of whether the headset 250 is docked on the device or not. When the headset 250 is docked, the base station will charge the headset battery.

Another example is that the functions that a system in accordance with an embodiment of the present invention performs when the user interacts with the device, vary based on the state of the application and the video module/headset at the time of the action. Examples of such variations based on states are provided below.

In one embodiment, a device in accordance with an embodiment of the present invention, along with application software 285, provides telephone-like functionality with which the user is presumably very familiar. In one embodiment, the call control behavior of a device in accordance with an embodiment of the present invention is modeled after a cordless telephone with a speakerphone base station. The audio path can vary between one analogous to a speakerphone, and one analogous to a cordless handset/headset. For example, the external speakers 120 that a user may have connected to the host 150, along with the either the microphone 434 on the device, or an separate microphone 110 that a user may have connected to the host, together are analogous to a speakerphone. The headset 250 is analogous to a cordless telephone. In one embodiment, when the headset 250 is docked, the external speakers 120 and microphone 434 may be used as the default audio devices for audio input and output. On the other hand, when the user picks up the headset 250 (e.g., when an incoming call is signaled by a ring), a system in accordance with an embodiment of the present invention seamlessly switches the audio path to the headset 250. This is analogous to a regular telephone ringing, and the user picking up the handset of the phone, and seamlessly being able to talk into, and hear from, the handset.

It is to be noted that, in one embodiment, regardless of the audio path eventually used, when an incoming call is received, the ring signal emits from the external sound source/speakers 120. This is because often the speaker on the headset is not sufficiently loud to alert the user to an incoming call unless it is placed on the user's ear. Because of this, in one embodiment, rings always go to the external speakers 120, as in a telephone.

Some examples of parameters with varied states which affect the way in which the system functions, include headset 250 position, the strength (and/or presence/absence) of the wireless connection between the headset 250 and the webcam 200, and the user's actions.

As mentioned above, the headset 250 may be docked (i.e. placed in the base unit) or undocked (i.e. not placed in the base unit). It is to be noted that in one embodiment, as illustrated in FIG. 2, the base unit may be the webcam 200 which houses the video module 205 in addition to the battery charger 215 and the wireless module 235*a*. In another embodiment, the base unit is a separate physical entity which does not include the video module 205, but includes the battery charger 215 and the wireless module 235*a*. In yet another embodiment, the base unit includes the battery charger 215 alone.

Depending on the status and strength of the wireless connection, the headset 250 may be connected or disconnected from the base unit or webcam 200. The headset must be connected in order to stream audio to it. User action is also a relevant parameter. For instance, when a call is received, the user may choose to interact with the headset 250, the control buttons 436, 438, on the device, or with the software application 285 itself.

Table 1 provides some examples of how a system in accordance with an embodiment of the present invention functions for an incoming call.

TABLE 1

Call pick up (Incoming call)

| Headset Position | Wireless Connection | User action | Effect | Audio path |
|---|---|---|---|---|
| Docked | Disconnected | Pick up headset | No action (Keep ringing) | Default audio device |
| Docked | Connected | Pick up headset | Call pick-up | Headset |
| Docked | N/A | Answer via application software | Call pick-up | Default audio device |
| Docked | N/A | Press Launch button | Call pick-up | Default audio device |
| Docked | N/A | Connect/disconnect headset | No action (keep ringing) | Default audio device |
| Un-Docked | Disconnected | Answer via application software | Call pick-up | Default audio device |
| Un-Docked | Disconnected | Connects headset | Call pick up | Headset |
| Un-Docked | Disconnected | Press Start button | Call pick up | Default audio device |
| Un-Docked | Connected | Answer via software application | Call pick-up (Notify user of device in use) | Headset |
| Un-Docked | Connected | Disconnect headset | No action (Keep ringing) | Default audio device |

TABLE 1-continued

Call pick up (Incoming call)

| Headset Position | Wireless Connection | User action | Effect | Audio path |
|---|---|---|---|---|
| Un-Docked | Connected | Press Launch button | Call pick up (Notify user of device in use) | Headset |

Once a call has been established, a system in accordance with an embodiment of the present invention allows for disconnecting the call or transferring audio from one audio path to another. Table 2 provides examples of some such transitions.

TABLE 2

Hanging up/Switching audio path during a call

| Headset Position | Wireless Connection | User action | Effect | Audio path |
|---|---|---|---|---|
| Docked | Connected | Picks up headset | Switch to headset | Headset |
| Docked | Disconnected | Picks up headset | No action | Default audio device |
| Docked | N/A | Hang up via application software | Call hang-up | Default audio device |
| Docked | N/A | Connects or disconnects headset | No action | Default audio device |
| Docked | N/A | Presses the Launch button | Call Hang up | Default audio device |
| Un-Docked | Disconnected | Connects headset | Switch to headset | Headset |
| Un-Docked | Disconnected | Docks the headset | No action | Default audio device |
| Un-Docked | Disconnected | Presses the Launch button | Call Hang up | Default audio device |
| Un-Docked | Connected | Disconnects headset | Call Hang up | Default audio device |
| Un-Docked | Connected | Docks the headset | Call Hang up | Default audio device |
| Un-Docked | Connected | Presses the Launch button | Switch to Speaker | Default audio device |
| Un-Docked | N/A | Hang up via application software | Call hang-up | N/A |

As described above, a system in accordance with an embodiment of the present invention can seamlessly switch between using the default audio device (e.g., external speakers 120 and microphone 434) and the headset 250, based on the states of the various system components, as well as on user actions. In addition, audio is also electronically silenced in one embodiment by pressing the Pause button 438. In one embodiment, this switching of audio paths and muting of audio is performed by a Switch and Mute module 2245 in the driver software 275. In one embodiment, the driver software 275 contains all the tools necessary to intercept and manipulate audio streams in the system.

Figure 22:
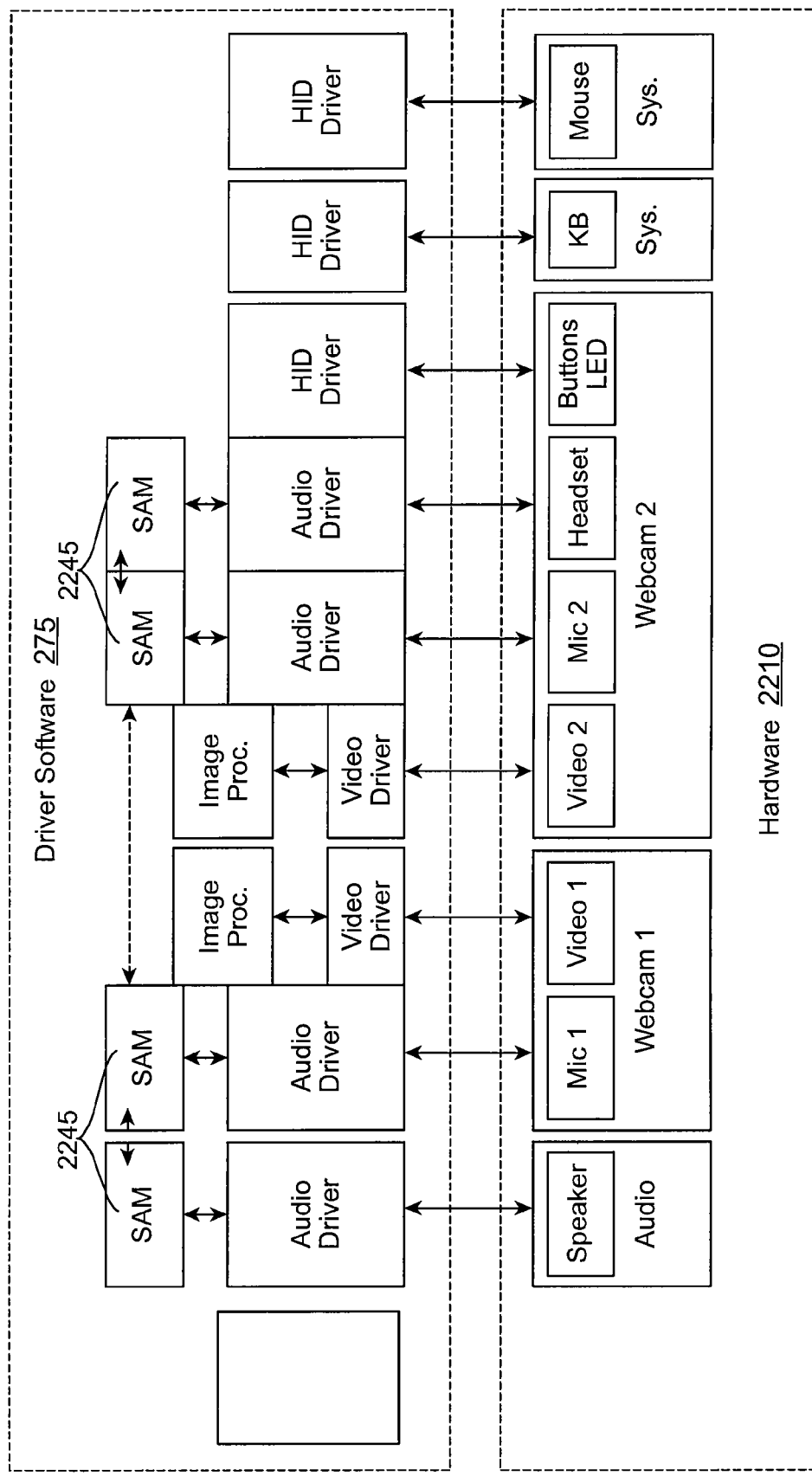
FIG. 22

FIG. 22 is a block diagram illustrating the audio framework in a system in accordance with one embodiment of the present invention. Numerous devices (hardware) and the driver software 275 are shown.

The hardware shown in FIG. 22 includes two webcams—webcam 1 and webcam 2. In addition, the hardware includes system input devices such as a keyboard and a mouse. Further, audio devices such as speakers and separate microphone (not shown in the Figure) are also included. Webcam 1 includes microphone 1 and video module 1, and webcam 2 includes microphone 2, video module 2, a headset and an LED.

The driver software 275 includes HID drivers for the keyboard, mouse, and other buttons, video drivers and some image processing software to process the video data, and audio drivers to process the audio data received from the hardware. In addition, the Switch and Mute (SAM) modules 2245 are coupled with the audio drivers in order to perform switching of audio paths and muting of audio. The functioning of the SAM modules 2245 is discussed in some detail below. In other embodiments, other processing, such as Acoustic Echo Cancellation (AEC), may also take place in the driver software 275.

The SAM modules 2245 allow for quick and easy creation of specific audio stream interception based functionality. In particular, the SAM modules 2245 permit access to any of the audio streams in the system. In one embodiment, when the Pause button 438 is pressed, the SAM modules mute all speakers in the system, as well as all microphones in the system. In addition, the SAM modules 2245 can reroute audio traffic to/from one audio device to/from another, e.g., a speaker and a microphone to a USB Bluetooth headset. In one embodiment, the switching of audio paths, and the muting of audio is performed by separate modules. In one embodiment, this is done at the lowest possible level thus this is transparent to other system components.

The above-described arrangements of apparatus and methods are merely illustrative of applications of the principles of this invention and many other embodiments and modifications may be made without departing from the spirit and scope of the invention as defined in the claims. For example, the video module 205 depicted in FIG. 2 could be in a separate physical device, distinct from the physical device which houses the battery charger module 215, the wireless module 235a, and the audio conversion module 225. The scope of the invention should, therefore, be determined not with reference to the above description, but instead should be determined with reference to the appended claims along with their full scope of equivalents.

What is claimed is:

1. A camera stand comprising:
   a housing;
   a camera mounted in said housing;
   a wireless transceiver mounted in said housing for communicating with a wireless audio headset;
   a bus connection to a computer;
   an audio conversion circuit mounted in said housing for converting audio signals received wirelessly into audio signals for transmission over said bus;
   an audio receptacle in said housing for storing said wireless audio headset;
   a battery charger, connected to said audio receptacle, for charging said wireless audio headset; and
   a bus interface circuit for transmitting over said bus both video signals from said camera and audio signals from said audio conversion circuit.

2. The camera stand of claim 1, further comprising:
   a control module for controlling the video module and the wireless audio headset.

3. The camera stand of claim 2, wherein the control module comprises:
   a pause button for interrupting the audio data and the video data received by the host.

4. The camera stand of claim 3, wherein the pause button being pressed electronically silences the audio data.

5. The camera stand of claim 3, wherein the pause button being pressed activates a mechanical shutter which covers a part of the video module.

6. The camera stand of claim 2, wherein the control module comprises:
   a launch button for launching an application software program.

7. The camera stand of claim 6, wherein the application software program is a videoconferencing program.

8. The camera stand of claim 7, wherein the application software program is an instant messaging program.

9. The camera stand of claim 1, wherein the audio conversion circuit further converts audio data received from the host into audio data for wireless transmission to the wireless audio headset.

* * * * *